Jan. 17, 1933.  H. G. SCKOWSKA  1,894,474
RIDGE CUTTER FOR DISK HARROWS
Filed May 26, 1932    2 Sheets-Sheet 1

Inventor

Henry G. Sckowska

By Clarence A. O'Brien
Attorney

Jan. 17, 1933. H. G. SCKOWSKA 1,894,474
RIDGE CUTTER FOR DISK HARROWS
Filed May 26, 1932 2 Sheets-Sheet 2
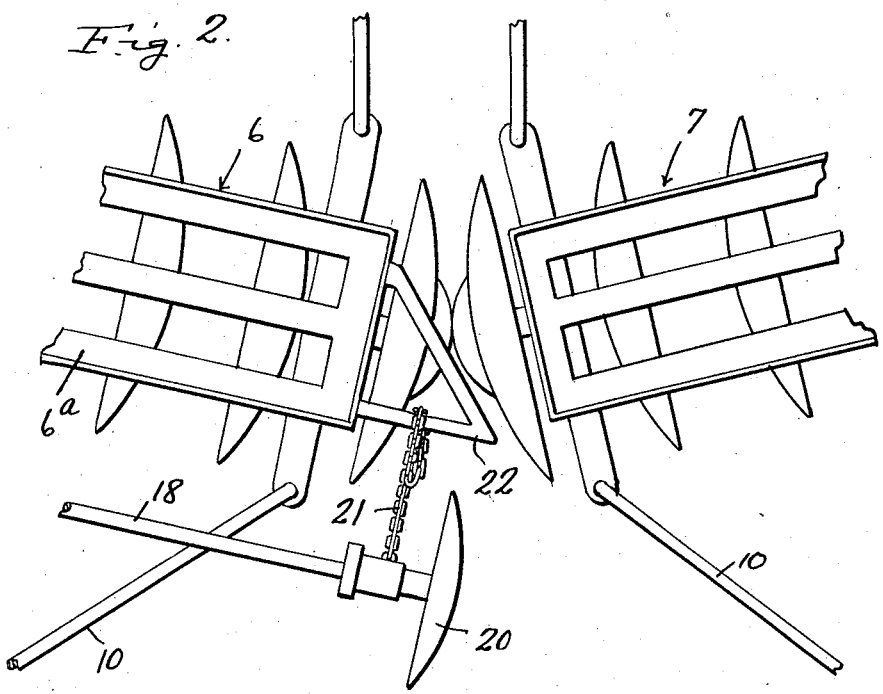
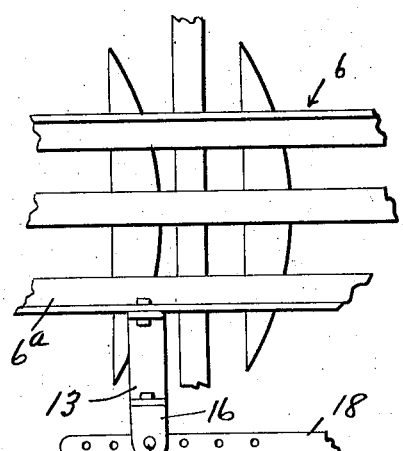
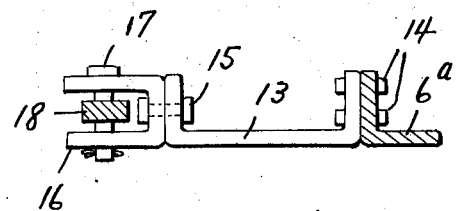
Inventor
Henry G. Sckowska
By Clarence A. O'Brien
Attorney Patented Jan. 17, 1933

1,894,474

UNITED STATES PATENT OFFICE

HENRY G. SCKOWSKA, OF BLUE MOUND, ILLINOIS

RIDGE CUTTER FOR DISK HARROWS

Application filed May 26, 1932. Serial No. 613,732.

This invention relates to disk harrows and more specifically to double disk harrows, and in accordance with the present invention means, readily attachable to the harrow is provided for cutting down and cultivating the central ridge which is left between the inner disks of the front gangs and which usually escapes the action of the rear gangs.

The invention together with its numerous objects and advantages will be best understood from a study of the following description, taken in connection with the accompanying drawings wherein:

Figure 2 is a fragmentary plan view on an enlarged scale, illustrating certain features of the invention to be hereinafter more fully referred to.

Figure 3 is a fragmentary top plan view of a portion of one of the front gangs showing the manner of adjustably and pivotally connecting the reach bar of the ridge cutter to said front gang, and Figure 4 is a fragmentary sectional view illustrating the manner of connecting one end of the reach bar to a weight box of a disk gang.

Figure 1:
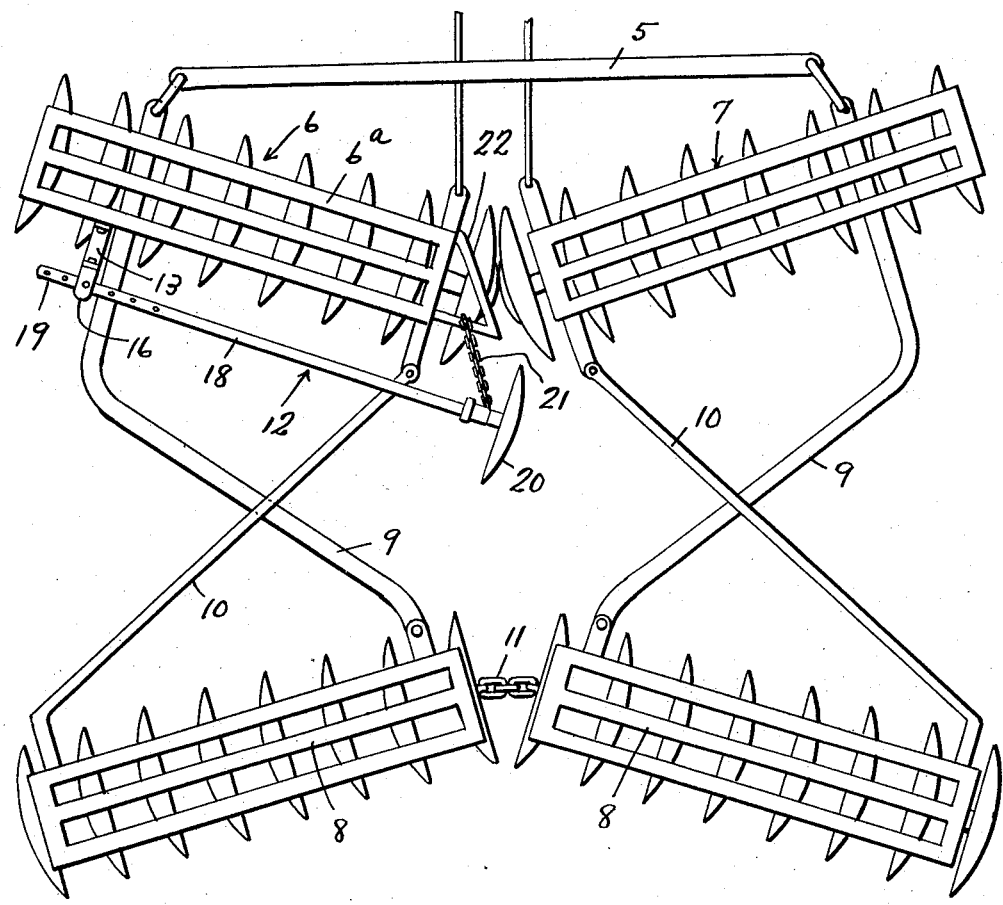
Figure 1 is a plan view of a double disk harrow embodying the features of the present invention.

Referring in detail to the drawings it will be seen that the invention is adapted to be applied to a double disk harrow of conventional construction, the said harrow comprising the front frame bar 5, the rearwardly converging front gangs 6, 7, together with the forwardly converging rear gangs 8 connected to the front frame bar 5 by the bars 9, and to the front gangs 6, 7 by the bars 10. At their converging ends the rear gangs 8 are connected by flexible sections 11. The structure just described is conventional and a more detailed description thereof is deemed unnecessary.

My improved ridge cutter is designated by the reference character 12 and includes a substantially U-shaped bracket 13 that is fixedly secured as at one end as at 14 to the rear side of the weight box 6a of the gang 6. Pivoted to the free end of the bracket 13 as at 15 is a U-shaped member 16 that has its side portion apertured for receiving a pin 17. A reach bar 18 is provided and the same at one end is provided with a series of spaced apertures 19 adapted to be selectively alined with the apertures in the sides of the U-shaped member 16 for receiving the pin 17 whereby an adjustable pivotal connection is provided between the reach bar and the pivoted member 16. Suitably journalled on the other end of the reach bar 12 is a cutting disk 20, and also adjacent the last mentioned end, the reach bar 18 has secured thereto one end of a relatively short chain section 21. A substantially triangular shaped bracket 22 is suitably provided on the inner end of the weight box 6a and the chain 21 has the free end thereof engaged with the bracket 22 for supporting the disk equipped end of the rear bar 18.

As shown when the ridge cutter is in proper position on the harrow, the disk 20 of the cutter is positioned approximately centrally of the space existing between the disk of the rear gang and in substantial alinement with the space between the inner disk and the front gang so that it engages the ridge usually left at this point and will cut out the weeds which would otherwise remain.

It will be also apparent, that the ridge cutter can be adjusted longitudinally if desired as may be required as the angle of the gang may be changed.

Even though I have herein shown and described the preferred embodiment of the invention, it is to be understood that the same is susceptible of further changes, modifications and improvements coming within the scope of the appended claims.

Having thus described my invention, what I claim as new is:

1. In combination with a double disk harrow including a disk gang and a weight box therefor, of a lateral bracket mounted on one side of the weight box and an end bracket mounted at one end of the weight box, a reach bar, adjustable pivot means connecting one end of the reach bar with the lateral bracket, flexible means suspending the other end of the reach bar from the end bracket, and a disk journalled on the last named end of the reach bar.

2. In combination with the weight box of a disk gang, of a bracket fixedly mounted adjacent one end of the weight box, a second bracket fixedly mounted adjacent the other end of the weight box, a U-shaped member pivotally mounted on the first named bracket, a reach bar, adjustable pivot means connecting the reach bar with said pivoted member, a flexible member connecting the second named bracket with the reach bar, and a disk journalled on said reach bar.

3. In combination with a pair of pivotally mounted disk gangs converging rearwardly when in working position, of a reach bar, means for pivotally and adjustably connecting one end of the reach bar with the weight box of one of said gangs, flexible means connected with the weight box and the reach bar for suspending the other end of said bar from the weight box, and a disk journalled on said reach bar and positioned substantially midway between the inner disks of the gangs.

In testimony whereof I affix my signature.

HENRY G. SCKOWSKA.